US012711035B2

(12) United States Patent
Sugumar

(10) Patent No.: US 12,711,035 B2
(45) Date of Patent: Aug. 18, 2026

(54) PROCESSOR PERFORMANCE PROFILING USING AGENTS

(71) Applicant: Akeana, Inc., San Jose, CA (US)

(72) Inventor: Rabin Sugumar, Sunnyvale, CA (US)

(73) Assignee: Akeana, Inc., Santa Clara, CA (US)

( * ) Notice: Subject to any disclaimer, the term of this patent is extended or adjusted under 35 U.S.C. 154(b) by 428 days.

(21) Appl. No.: 18/389,995

(22) Filed: Dec. 20, 2023

(65) Prior Publication Data

US 2024/0211366 A1 Jun. 27, 2024

Related U.S. Application Data

(60) Provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional
(Continued)

(51) Int. Cl.
*G06F 11/34* (2006.01)
*G06F 11/30* (2006.01)
*H04L 43/02* (2022.01)
*H04L 43/04* (2022.01)

(52) U.S. Cl.
CPC .......... *G06F 11/3409* (2013.01); *G06F 11/30* (2013.01); *G06F 11/3466* (2013.01); *H04L 43/02* (2013.01); *H04L 43/04* (2013.01)

(58) Field of Classification Search
None
See application file for complete search history.

(56) References Cited

U.S. PATENT DOCUMENTS 5,657,253 A * 8/1997 Dreyer .................. G06F 11/348 708/530
6,374,369 B1 * 4/2002 O'Donnell .......... G06F 11/3466 717/130

(Continued)

FOREIGN PATENT DOCUMENTS

WO 2022117687 A1 6/2022

*Primary Examiner* — Lashonda Jacobs-Burton
(74) *Attorney, Agent, or Firm* — Adams Intellex, PLC

(57) ABSTRACT

Techniques for performance profiling based on processor performance profiling using agents are disclosed. A processor core is accessed. The processor core includes a performance counter, a performance counter storage area, and a performance counter control register. The processor core includes a performance monitoring interface. The performance counter, performance counter storage area, and performance counter control register are assigned to an external profiling agent, which loads the performance counter and the performance counter control register. The loading is based on a particular event in the processor core. A program state is saved to the storage area, based on a counter event in the performance counter and an enable bit in the performance counter control register being set. The program state that is saved corresponds to code being executed on the processor core. The program state is read, from the storage area, by the external profiling agent.

26 Claims, 7 Drawing Sheets

Related U.S. Application Data application No. 63/526,009, filed on Jul. 11, 2023, provisional application No. 63/521,365, filed on Jun. 16, 2023, provisional application No. 63/471,283, filed on Jun. 6, 2023, provisional application No. 63/467,335, filed on May 18, 2023, provisional application No. 63/463,371, filed on May 2, 2023, provisional application No. 63/462,542, filed on Apr. 28, 2023, provisional application No. 63/444,619, filed on Feb. 10, 2023, provisional application No. 63/439,761, filed on Jan. 18, 2023, provisional application No. 63/436,133, filed on Dec. 30, 2022, provisional application No. 63/436,144, filed on Dec. 30, 2022, provisional application No. 63/435,831, filed on Dec. 29, 2022, provisional application No. 63/435,343, filed on Dec. 27, 2022, provisional application No. 63/434,104, filed on Dec. 21, 2022.

(56) References Cited

U.S. PATENT DOCUMENTS

| | | | | |
|---|---|---|---|---|
| 6,934,809 | B2 | 8/2005 | Tremblay et al. | |
| 7,506,105 | B2 | 3/2009 | Al-Sukhni et al. | |
| 8,230,433 | B2 * | 7/2012 | Chiu | G06F 11/3409 714/39 |
| 8,356,122 | B2 * | 1/2013 | Satterfield | G06F 11/348 714/704 |
| 10,013,356 | B2 | 7/2018 | Chou | |
| 10,365,988 | B2 * | 7/2019 | Combs | G06F 11/348 |
| 10,671,394 | B2 | 6/2020 | Britto et al. | |
| 10,929,948 | B2 | 2/2021 | Benthin et al. | |
| 11,288,405 | B2 | 3/2022 | Belgarric et al. | |
| 11,403,099 | B2 | 8/2022 | Cerny et al. | |
| 11,403,225 | B2 | 8/2022 | Zheng et al. | |
| 11,429,529 | B2 | 8/2022 | Hornung et al. | |
| 11,442,863 | B2 | 9/2022 | Shulyak et al. | |
| 11,474,130 | B2 | 10/2022 | Lentz et al. | |
| 11,486,911 | B2 | 11/2022 | Tuncer et al. | |
| 2006/0085602 | A1 * | 4/2006 | Huggahalli | G06F 12/0862 712/E9.047 |
| 2014/0306903 | A1 * | 10/2014 | Huang | G06F 11/3409 345/173 |
| 2016/0283272 | A1 * | 9/2016 | Coleman | G06F 9/5016 |
| 2016/0294396 | A1 * | 10/2016 | Jayaraman | H03K 21/023 |
| 2020/0241998 | A1 * | 7/2020 | Kleiner | G06F 11/323 |
| 2022/0004639 | A1 | 1/2022 | Yardi et al. | |
| 2022/0029780 | A1 | 1/2022 | Dafali | |
| 2022/0197657 | A1 | 6/2022 | Soundararajan et al. | |
| 2025/0181466 | A1 * | 6/2025 | Chiavacci | G06F 11/263 |

* cited by examiner

MULTICORE PROCESSOR 410

CORE 0 420
PMP 422
MMU 424
I$ 426
D$ 428
L2 CACHE 430

CORE 1 440
PMP 442
MMU 444
I$ 446
D$ 448
L2 CACHE 450

CORE N-1 460
PMP 462
MMU 464
I$ 466
D$ 468
L2 CACHE 470

PLIC / ACLINT 414
L3 CACHE 412
JTAG 416
AXI4 / ACE / CHI 418

AXI INTERCONNECT 480

PERIPHERALS 490

PROCESSOR PERFORMANCE PROFILING USING AGENTS

RELATED APPLICATIONS

This application claims the benefit of U.S. provisional patent applications "Processor Performance Profiling Using Agents" Ser. No. 63/434,104, filed Dec. 21, 2022, "Prefetching With Saturation Control" Ser. No. 63/435,343, filed Dec. 27, 2022, "Prioritized Unified TLB Lookup With Variable Page Sizes" Ser. No. 63/435,831, filed Dec. 29, 2022, "Return Address Stack With Branch Mispredict Recovery" Ser. No. 63/436,133, filed Dec. 30, 2022, "Coherency Management Using Distributed Snoop" Ser. No. 63/436,144, filed Dec. 30, 2022, "Cache Management Using Shared Cache Line Storage" Ser. No. 63/439,761, filed Jan. 18, 2023, "Access Request Dynamic Multilevel Arbitration" Ser. No. 63/444,619, filed Feb. 10, 2023, "Processor Pipeline For Data Transfer Operations" Ser. No. 63/462,542, filed Apr. 28, 2023, "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, and "Cache Snoop Replay Management" Ser. No. 63/605,620, filed Dec. 4, 2023.

Each of the foregoing applications is hereby incorporated by reference in its entirety.

FIELD OF ART

This application relates generally to performance profiling and more particularly to processor performance profiling using agents.

BACKGROUND

For centuries, humans have designed devices that are believed to save labor, improve living standards, and assist with daily activities such as cooking, cleaning, and transportation. These devices were developed to simplify the tasks, amplify human capabilities, and improve the effectiveness of the tasks. Over time, the devices have evolved as new technologies have emerged. Low temperature fired earthenware crockery and pots were replaced by high temperature fired versions which were far more durable. Simple wooden spits and wooden cooking implements were replaced by iron ones which were far stronger and could be reused indefinitely. Open fires were replaced by brick-lined fireplaces, beehive ovens, and wood burning stoves and ovens that enabled better temperature control, provided for domestic heating, and reduced the risk of fire. Travel became less arduous and could involve greater distances as new modes of transportation emerged. Travel over water by boat or ship improved as more oars and later more sails were added to the vessels. The sailing ships were provided better control by the increased number of sails. Travel over land improved as more reliable roads and bridges were built, suspension components were added to carriages, and eventually draft animals were replaced with motorized vehicles. The general trend of the devices has been toward improved usefulness and safer operation.

Other devices that have greatly benefited from evolving technology are used for the measurement of time. Early devices included the sundial which cast a shadow based on the changing position of the sun throughout the day. Greater accuracy was achieved by making the gnomon adjustable to account for differing solar angles throughout the year. Hourglasses were used to measure the passage of time by the transfer of sand from one portion of a glass vessel to another, while the clepsydra used a float to indicate time as water was added to or drained from a vessel. Early mechanical timekeeping implements were simple devices, striking once in the morning and once in the evening to signal farmers to head to and return from the fields. Soon, dials and a single hand were included to indicate portions of hours throughout the day and night. Later, as the measurement of time became critical for navigation, high-precision chronometers were developed to determine longitude. Timing precision was also critical to the safe operation of railroads.

While marvels when introduced, many mechanical inventions have been greatly improved by devices using semiconductors or chips. Complicated mechanical systems can be enhanced, improved, simplified, or even replaced by semiconductors and code, resulting in systems that are highly accurate, easy to modify, and in some cases, less expensive to produce. As a result, semiconductor devices are finding applications in products too numerous to name. Appliances, timepieces, vehicles, greeting cards, novelty socks, and more have all been enhanced by the inclusion of semiconductor devices in these products. These inventions have provided expanded feature sets, achieved far higher levels of performance, and reached far greater degrees of efficiency by controlling the mechanical systems with semiconductor ones.

SUMMARY

Processors of various types enable a wide range of devices to perform essential, useful, and desirable tasks and applications. The applications can include telephony, messaging, data processing, patient monitoring, vehicle access and operation control, etc. The processors are coupled to additional elements that enable the processors to execute their assigned applications. The additional elements typically include one or more of shared, common memories, communications channels, peripherals, and so on. Monitoring the processors, the additional elements, and application code while it is executing is highly desirable. The monitoring enables the tracking of which code is executing, what computational resources are being used by a code, what operating conditions of the processor and other elements are present, etc. The monitoring is also useful for detecting execution and operation anomalies, which can indicate the presence of malicious code, external attacks, and the like. However, monitoring the processors as they are executing applications can be difficult, because using the processors to monitor themselves takes execution cycles away from the executing applications. Instead, an external agent can be used to perform monitoring tasks and to generate a performance profile.

Techniques for performance profiling based on processor performance profiling using agents are disclosed. A processor core is accessed. The processor core includes a performance counter, a performance counter storage area, and a performance counter control register. The processor core includes a performance monitoring interface. The performance counter, performance counter storage area, and performance counter control register are assigned to an external profiling agent, which loads the performance counter and the performance counter control register. The loading is based on a particular event in the processor core. A program state is saved to the storage area, based on a counter event in the performance counter and an enable bit in the performance counter control register being set. The program state that is saved corresponds to code being executed on the processor core. The program state is read, from the storage area, by the external profiling agent.

A processor-implemented method for performance profiling is disclosed comprising: accessing a processor core, wherein the processor core includes a performance counter, a performance counter storage area, and a performance counter control register, and wherein the processor core includes a performance monitoring interface; assigning the performance counter, the performance counter storage area, and the performance counter control register to an external profiling agent; loading the performance counter and the performance counter control register by the external profiling agent; saving a program state to the storage area, based on a counter event in the performance counter and an enable bit in the performance counter control register being set, wherein the program state that is saved corresponds to code being executed on the processor core; and reading the program state, from the storage area, by the external profiling agent.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
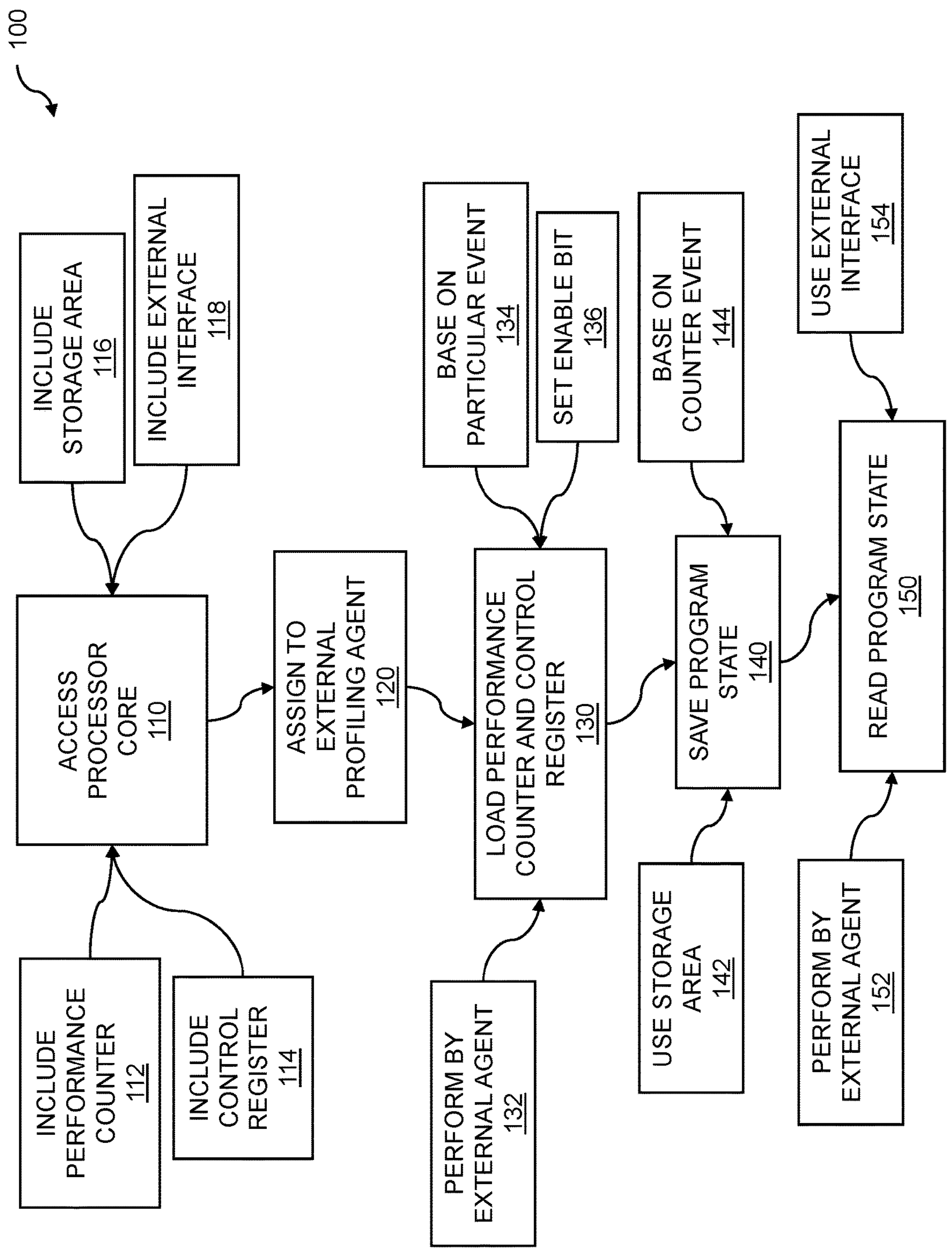
FIG. 1 is a flow diagram for processor performance profiling using agents.

Techniques for performance profiling based on processor performance profiling using agents are enabled. A processor such as a standalone processor, a processor chip, a processor core, and so on can be used to perform various data processing tasks. The processing of data can be significantly enhanced by using two or more processors to process the data. The processors can be performing substantially similar operations, where the processors can process different portions or blocks of data in parallel. The processors can be performing substantially different operations, where the processors can process different blocks of data or may try to perform different operations on the same data. As a processor such as a processor core is executing code associated with a particular program, a performance profile can emerge based on the saved program state. The performance profile indicates which computational resources, such as processor time, memory accesses, operating system calls, and so on, are used by the executing code. The program state can be saved based on a particular event in a processor core. The particular event can include particular code running on the processor core, a human direction, and so on. A performance profile can be generated from saved program state data.

A code that is executing on a processor such as a processor core consumes computational resources. The resources include processor time, code complexity (e.g., number of processing steps), memory accesses, element usage such as arithmetic logic units (ALUs) and multipliers, Input/Output (I/O) systems, operating system calls, and so on. A particular code uses these resources as the code is executing as defined in the code. As a result, a "performance profile" that represents computational resource usage as the code is executing can be generated. The performance profile shows changes over time in resource usage as the code executes. Each time the code is executed, the performance profile is substantially similar. This substantial similarity can be monitored for changes in the performance profile. Some changes in the performance profile can be expected based on which codes are executing in the processor core at a given time, operating system activity, etc. The changes, when different enough, can indicate anomalous behavior of the code. The anomalous behavior can be indicative of malicious code. Thus, by identifying anomalous performance profile behavior, malicious code can be identified and addressed.

In order to free the processor core from generating the performance profile, an external profiling agent is used. Using the external profiling agent allows the processor to execute code, perform operating system tasks, and so on more effectively. The external profiling agent can determine which code is executing based on the processor to profile, which user direction is being performed, and so on. The external agent loads a performance counter and a performance counter control register associated with the processor core. The external profiling agent saves the program state to a storage area associated with the processor core. The saving is based on a performance counter event such as incrementing or decrementing the counter, counter overflow, etc. The event further includes a human direction. The external profiling agent can read the program state periodically to observe processor core usage, code execution characteristics, etc. The external profiling agent can generate a performance profile based on the saved program states. The program state further includes program execution identification values. These identification values, which can be unique to a particular code, can include an address space identifier (ASID) and/or a virtual machine identifier (VMID). The external profiling agent can further use these identification values to determine whether a code that is executing in the processor core is a legitimate code or a malicious one. Techniques presented herein address processor performance profiling using agents. The agents include external profiling agents that can operate independently of the processor core, thereby freeing the processor core to perform its code execution tasks. The performance profiles generated by the external profiling agent more accurately reflect the code execution profile.

A software agent can perform a variety of tasks, such as monitoring and profiling tasks. An external profiling agent can monitor the executing of code, and the processor state as the code is executing on the processor. The external profiling agent can monitor one or more program states, generate a performance profile from the program states, and so on. The program states can be associated with a particular code running in a processor, processor core, multicore processor, etc. A multicore processor can include a RISC-V™ processor. The processor cores can include homogeneous processor cores or heterogeneous processor cores. The cores can have substantially similar or different capabilities. Further elements can be associated with the one or more processor cores such as one or more of physical memory protection (PMP) elements, memory management (MMU) elements, level 1 (L1) caches, such as instruction caches and data caches, level 2 (L2) caches, and the like. A multicore processor can further include a level 3 (L3) cache, test and debug support such as joint test action group (JTAG) elements, a platform level interrupt controller (PLIC), an advanced core local interrupter (ACLINT), and so on. The external monitoring agent can further monitor states corresponding to the additional elements associated with the processor cores.

FIG. 1 is a flow diagram for processor performance profiling using agents. An agent, such as an external profiling agent, can be used to monitor one or more program states, to generate a performance profile based on one or more program states, and so on. The program states can be associated with a particular code running on a processor such as a processor core. The particular code can be executed on multiple processors. A processor can include a multicore processor such as a RISC-V™ processor. The processor cores can include homogeneous processor cores or heterogeneous processor cores. The cores that are included can have substantially similar capabilities or substantially different capabilities. The one or more processor cores can include further elements. The further elements can include one or more of physical memory protection (PMP) elements, memory management (MMU) elements, level 1 (L1) caches such as instruction caches and data caches, level 2 (L2) caches, and the like. A multicore processor can further include a level 3 (L3) cache, test and debug support such as joint test action group (JTAG) elements, a platform level interrupt controller (PLIC), an advanced core local interrupter (ACLINT), and so on.

The flow 100 includes accessing a processor core 110. The processor core can include a processor core within a plurality of processor cores. The processor cores can include homogeneous processor cores, heterogeneous processor cores, and so on. The cores can include general purpose cores, specialty cores, custom cores, etc. In embodiments, the cores can be associated with a multicore processor such as a RISC-V™ processor. The cores can be included in one or more integrated circuits or "chips", application-specific integrated circuits (ASICs), programmable gate arrays (PGAs), and the like. In the flow 100, the processor core includes a performance counter 112. The performance counter can be used to monitor events that can occur during code execution in a processor core. The performance counter can be further used to count the events, measure the events, and so on. Access to the performance counter can be limited by code priority, user authorization level, and so on. In the flow 100, the processor core includes a performance counter control register 114. The performance counter control register can include one or more fields, where the one or more fields can include one or more of an indication of an event to be monitored and profiled, whether profiling of an event is enabled of disabled, a sampling period for a status such as a program state, and the like. In the flow 100, the processor core includes a performance counter storage area 116. The storage area can be used to store a program state, a periodic sampling of the program state, etc. In embodiments, the performance counter control register includes settings for which event the performance counter is counting, whether profiling is enabled, and what a sampling period comprises.

In the flow 100, further to the elements just described, the multicore processor can include a performance monitoring interface 118. The performance monitoring interface can enable an agent, such as an external agent (described below), to access the processor core. The performance monitoring interface includes a performance counter, a performance counter storage area, and a performance counter control register. In embodiments, the performance monitoring interface can include an external interface. The interface can be based on one or more industry standard interfaces, interfaces specific to the multicore processor, and the like. In embodiments, the external interface can include an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. The external interface can enable connection between the processor core and an interconnect. In embodiments, the interconnect can include an AXI™ interconnect. The interconnect can enable the multicore processor to access a variety of peripherals such as storage elements, communications elements, networked elements, etc.

The flow 100 includes assigning 120 the performance counter, the performance counter storage area, and the performance counter control register to an external profiling agent. The external profiling agent can include code executing in semiconductor logic. The semiconductor logic can be coupled to the processor core in order to access the performance counter, the performance counter storage area, and the performance counter control register. The external profiling agent can determine an event to monitor, can capture data associated with an event such as particular code execution, and can execute other operations associated with performance monitoring. The external agent can further generate a performance profile (discussed below). By monitoring events such as particular code execution events externally to the processor core, the processor core can execute code, such as the particular code, without having to monitor code-related events substantially concurrently. Thus, monitoring by the external agent more accurately captures code execution performance.

The flow 100 includes loading 130 the performance counter and the performance counter control register. The loading can comprise transferring a number of bits, bytes, codes, etc. to the performance counter control register. The loading can be accomplished prior to execution of a particular code, while the particular code is executing, and so on. In the flow 100, the loading is accomplished by the external profiling agent 132. The transfer can be accomplished using the performance monitoring interface. The loading can further be accomplished using a memory mapped technique. In the flow 100, the loading by the external profiling agent is based on a particular event 134 in the processor core. Various types of events can be the bases for loading the performance counter and the performance counter control register. In embodiments, the particular event can include particular code running on the processor core. The particular code can include an application code, a user-created code, and the like. In other embodiments, the particular event includes human direction. The human direction can be provided by an authorized user such as a system administrator or "sysadmin". The sysadmin may perform a routine check of code executing on the processor core, request further information about an executing code, act against malicious code, and the like. In embodiments, the external profiling agent can load the performance counter and the performance counter control register, based on the particular event. The particular event can include one or more of the events just described. In the flow 100, the loading the performance counter and the performance counter control register is based on setting 136 an enable bit. The enable bit can indicate whether performance monitoring is enabled or disabled. If enabled, then performance monitoring can proceed. If disabled, then performance monitoring will not be conducted by the external agent.

The flow 100 includes saving a program state 140. The program state can be obtained from one or more program state registers in the processor core. The program state can include information associated with a command or instruction within the code, before the instruction is executed, during instruction execution, after instruction execution, etc. The program state can include an alteration of a computational resource. An alteration can include writing or storing data to an address in memory. In the flow 100, the program state is saved to the storage area 142. The storage area can include a register file, cache memory, shared memory, and so on. The storage area can be within the processor core, coupled to the processor core, accessible to the processor core, etc. In the flow 100, the saving a program state is based on a counter event 144 in the performance counter and an enable bit in the performance counter control register being set. In embodiments, the program state that is saved can correspond to code being executed on the processor core.

The event that can be the basis for loading the performance counter and the performance counter control register can include a counter event. In embodiments, the counter event can include incrementing the performance counter by a value N. The value N can be assigned based on human direction, a typical value, and so on. The value N can include a large value, a small value, etc. In embodiments, the performance counter can be incremented to a value M. The value M can be substantially similar to the value N, or can be substantially different from the value N. The choice of values for N and M can enable a fine-grained increment, a course-grained increment, etc. In other embodiments, the counter event can include decrementing the performance counter by a value N. The value of N for decrementing the performance counter can be substantially similar to the value of N for incrementing the performance counter, can be substantially different, etc. In further embodiments, the performance counter can be decremented to a value M. The value of M for decrementing can be substantially similar to or substantially different from the value of M for incrementing the performance counter. In embodiments, the saving a program state can be periodically repeated, based on the external profiling agent. The periodic repeating can be based on a number of processor cycles, a number of events, and so on. In embodiments, the saving of repeated program states occurs on a regular basis. The regular basis can include an amount of time. The amount of time can be set by the external profiling agent, by a systems operator ("sysop"), and the like. In embodiments, the regular basis can be every 100 ms. In embodiments, the performance counter, the performance counter storage area, and the performance counter control register use logic associated with the performance counter to control the saving. The logic can be within the processor core, coupled to the processor core, etc.

The flow 100 includes reading 150 the program state from the storage area. The reading can include accessing data in a register file, cache memory, shared memory, and so on. The reading can include accessing data bytes, words, blocks, and the like. The reading can include reading using a direct memory access (DMA) technique. In the flow 100, the reading the program state is performed by the external profiling agent 152. The external profiling agent can request the data, initiate a data transfer, control the reading, etc. The one or more program states read by the external profiling agent can include the repeatedly saved program states. Further embodiments can include generating a performance profile, based on the saving of repeated program states. The performance profile can include text, graphics, animations, analysis results, etc. In embodiments, the performance profile is generated by the external profiling agent. In the flow 100, the reading is accomplished using an external interface 154. The external interface can support a variety of standard processor interfaces. The standard processor interfaces can include one or more of an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
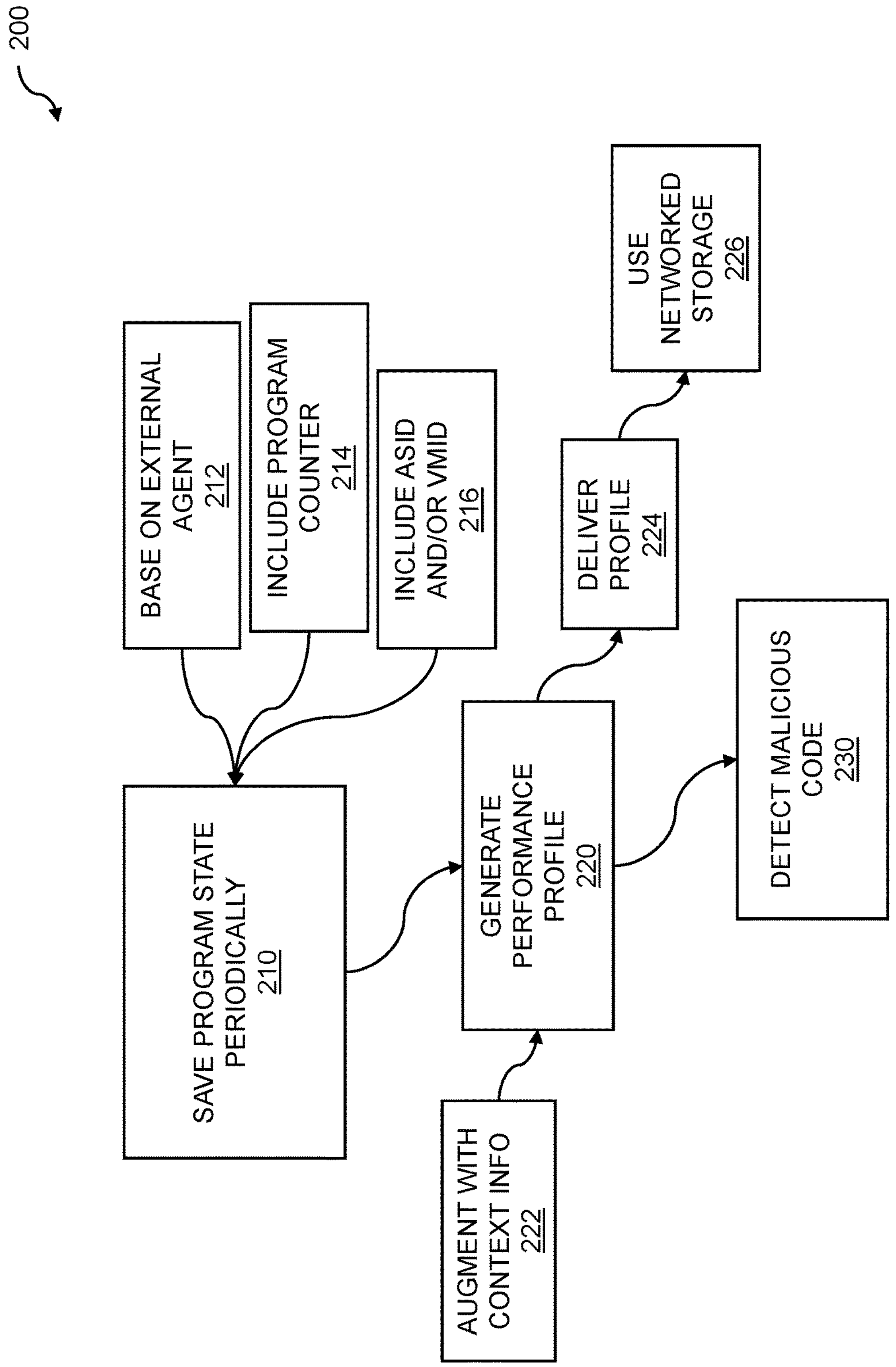
FIG. 2 is a flow diagram for agent usage.

FIG. 2 is a flow diagram for agent usage. The agent, which can include an external profiling agent, can access a performance counter, a performance counter storage area, and a performance counter control register included in a processor core. The external profiling agent can read the saved program state, where the saved program state is associated with execution of a particular code. The program state can be saved periodically. By reading the saved program state, the external profiling agent can generate a performance profile for the executing code. The performance profile can be used to identify code legitimately executing on the processor code. A performance profile not associated with legitimate code can be deemed anomalous. The code associated with the anomalous performance profile can include malicious code. External profiling agent usage enables processor performance profiling. A processor core is accessed, wherein the processor core includes a performance counter, a performance counter storage area, and a performance counter control register, and wherein the processor core includes a performance monitoring interface. The performance counter, the performance counter storage area, and the performance counter control register are assigned to an external profiling agent. The performance counter and the performance counter control register are loaded by the external profiling agent. A program state is saved to the storage area, based on a counter event in the performance counter and an enable bit in the performance counter control register being set, wherein the program state that is saved corresponds to code being executed on the processor core. The program state is read, from the storage area, by the external profiling agent.

The flow 200 includes saving 210 the program state periodically. Discussed throughout, a program state associated with a particular program that is running on a processer core can be saved to a storage area associated with the processor core. In embodiments, the saving a program state can be periodically repeated. The periodic repeating of the saving can be based on a duration of time, a number of processor core cycles, an event, and so on. The periodic saving can capture the particular program usage of computational resources, memory accesses, etc. In the flow 200, the repeating saving the program state periodically can be based on an external agent 212. The external agent can include an external profiling agent. The external profiling agent can be assigned the performance counter, the performance counter storage area, and the performance counter control register associated with the processor core. The external profiling agent can load the performance counter and the performance counter control register. The loading can include indicating whether profiling is enabled or disabled, a particular code executing in the processor core to profile, etc.

A program state associated with the execution of the particular code can be saved to the storage area associated with the processor core. The saving the program state can be based on an event such as an execution exception, an interrupt, a counter event, a human direction, etc. In the flow 200, the program state can include a current program counter 214 state. The program counter state can include which instruction or instructions within a particular code are being fetched and executed. Including the program counter state enhances profiling of a particular code by enabling correlation of computational resource usage to the one or more instructions being fetched and executed at the time the resource usage state is saved. In the flow 200, the program state includes program execution identification values 216. The program execution identification values include an address space identifier (ASID) and/or a virtual machine identifier (VMID). The ASID and/or VMID identifications values can be used to determine that a particular code is a legitimate version of the code and that the code is authorized on the processor core. An invalid ASID and/or VMID can indicate that the particular code is invalid, corrupted, or unauthorized to be executed. The invalid ASID and/or VMID can indicate malicious code.

The flow 200 further include generating 220 a performance profile, based on the saving of repeated program states. The performance profile can include text, graphics, trends analysis, and so on. In embodiments, the performance profile can be generated by the external profiling agent. By using the external profiling agent to generate the performance profile, the processor core can allocate its computational resources to the execution of code such as a particular code. The generating the performance profile by the external profiling agent not only offloads the generating task from the processor core, but the generating by the external agent also improves accuracy of the performance profile. The flow 200 further includes augmenting 222 the performance profile using context information from the processor core. The context information can include a version of an operating system running on the processor core, a mix of codes being executed by the processor core, code execution statistics such as processor usage and memory usage, and so on. The flow 200 further includes delivering 224 the performance profile. The performance profile can be delivered to one or more users, saved to a file, and so on. Further embodiments include delivering the performance profile to a system administrator or system users. In a usage example, the system administrator can evaluate the performance profile and can determine whether the performance profile is substantially typical or nominal, the profile is anomalous and may be indicative of malicious code, etc. The flow 200 further includes delivering the performance profile to a networked storage area 226. The networked storage area can include shared storage such as network-attached storage (NAS), a storage area network (SAN), cloud-based storage, and so on.

In the flow 200, the performance profile enables 230 malicious code execution detection. The malicious code cade can be introduced by bad actors for execution by the processor core. The malicious code can be introduced to inflict financial damage, to extort payment, to cause equipment shutdown or physical damage, etc. The malicious code can take various forms and can be designed for nefarious purposes. The malicious code can include code for fileless malware to corrupt an operating system or system files, trojans, spyware, adware, rootkits, worms, bots, keyloggers, wiper malware, mobile malware, and the like. Because of the financial, operational, and at times physical damage that can be caused by the malicious code, it is imperative to detect the presence of malicious code as early and as quickly as possible. In embodiments, the malicious code execution detection can include performance anomaly detection. The performance anomaly detection can be based on the performance profile, where the performance profile can be "out of tolerance" (e.g., substantially different from an expected profile), unrecognized, etc.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
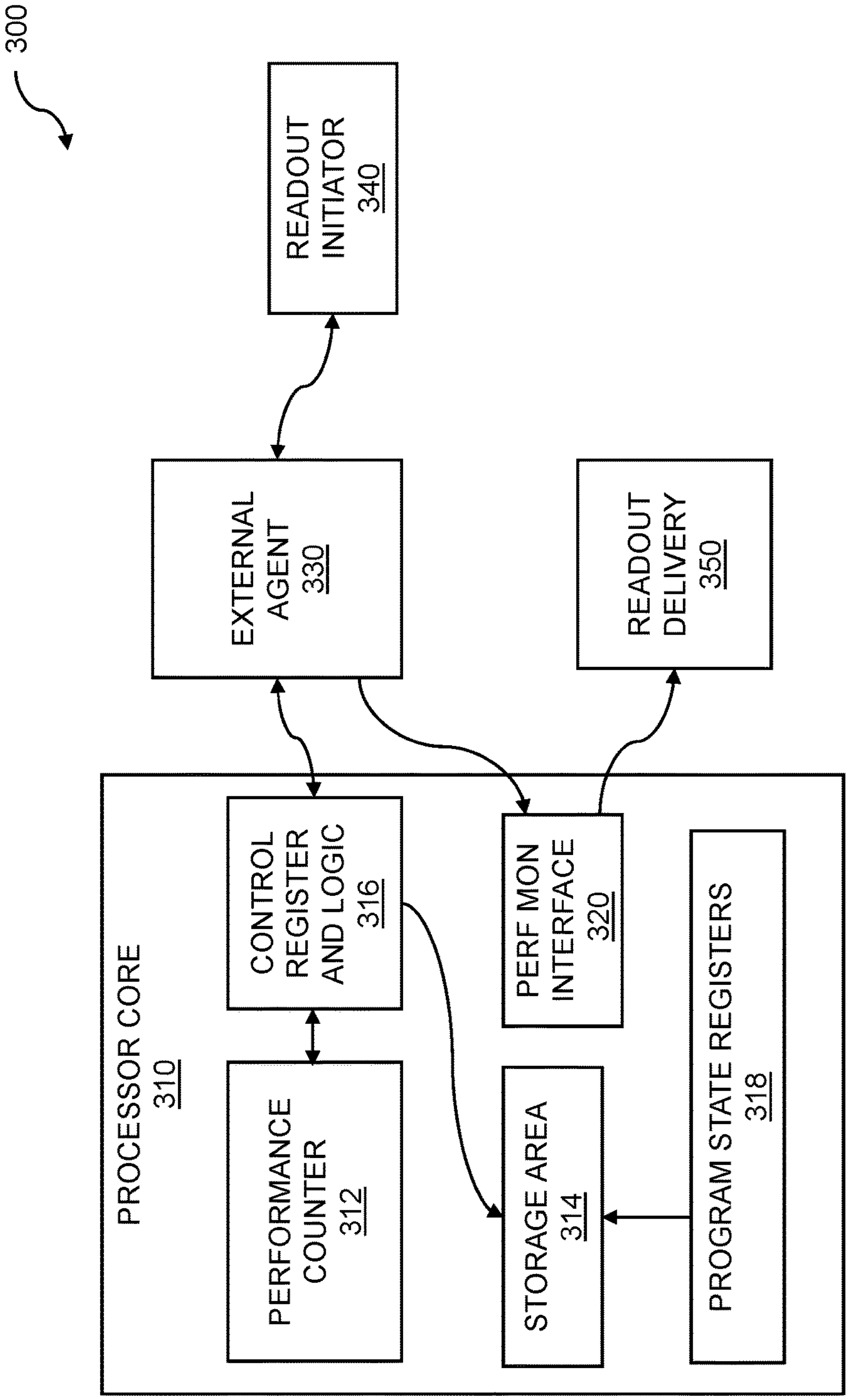
FIG. 3 is a system block diagram for performance profiling.

FIG. 3 is a system block diagram for performance profiling. Discussed above and throughout, the performance profiling can be used to gauge computational resource allocation and usage. The allocation and usage can be used to verify that a particular code that is being executed by a processor core is executing as expected. The performance profile can be generated based on repeated saving of program states read while the particular code is executing. The performance profile can be generated by an external profiling agent. Performance profiling enables processor performance profiling using agents. A processor core is accessed, wherein the processor core includes a performance counter, a performance counter storage area, and a performance counter control register, and wherein the processor core includes a performance monitoring interface. The performance counter, the performance counter storage area, and the performance counter control register are assigned to an external profiling agent. The performance counter and the performance counter control register are loaded by the external profiling agent. A program state is saved to the storage area, based on a counter event in the performance counter and an enable bit in the performance counter control register being set, wherein the program state that is saved corresponds to code being executed on the processor core. The program state is read, from the storage area, by the external profiling agent.

The system block diagram 300 includes a processor core 310. The processor core can include a processor core within a plurality of processor cores. The processor core can comprise one or more integrated circuits or chips, a processor core within one or more programmable or configurable integrated circuits such as FPGAs or ASICs, etc. In embodiments, the processor core can include RISC-V™ processor core. The processor can include various components that augment the operation of the processor core. In the system block diagram, the processor core includes a performance counter 312, a performance counter storage area 314, and a performance counter control register 316. The performance counter and the performance counter control register can be loaded by an external profiling agent (discussed below), where the loading can be based on a particular event in the processor core. The particular event can be associated with a particular code running on the processor core, on a human direction, and so on. The code that is running can include an operating system, an application, and so on. The human direction can include a direction from a system administrator, a request from one or more system users, etc. An event within the counter can enable saving a program state to the storage area 314. A counter event can include setting, resetting, incrementing, decrementing, etc. the counter. A counter event can further include a counter overflow. In embodiments, the saving a program state can be periodically repeated. The periodically repeating the saving of the program state can enable generation of a performance profile for code executing in the processor core. The program state that is saved can be read from one or more program state registers 318. The program state registers can include one or more of an application program status register (APSR), an arithmetic logic unit (ALU) flag, an interrupt program status register (IPSU), an execution program status register (EPSU), and the like. In embodiments, the program state can include a current program counter state. The processor core can further include a performance monitor interface 320. The performance monitor interface can provide an interface between the processor core and an external agent (discussed below), and the processor core and a readout delivery component (discussed below).

The system block diagram 300 includes an external agent 330. The external agent, which can include a profiling agent, can initiate a performance profile based on the occurrence of an event. As stated previously, the event can include a particular code running on the processor core, a direction received from a human operator such as a system operator, and so on. The performance counter, the performance counter storage area, and the performance counter control register can be assigned to the external profiling agent. To initiate a performance profile, the performance counter and the performance counter control register can be loaded by the external profiling agent. The loading can be based on a particular event, such as those events just mentioned, in the processor core. A program state can be saved to the storage area, based on a counter event in the performance counter and an enable bit in the performance counter control register being set, wherein the program state that is saved corresponds to code being executed on the processor core. The saving a program state can be periodically repeated, based on the external profiling agent. The periodic repeated saving of the program state enables analysis of the program state over time and can enable generation of a performance profile. The system block diagram 300 can include a readout initiator 340. The readout initiator can indicate that a performance profile readout should be initiated by the external agent 330. A readout can be initiated by a variety of events or programmed states, such as by an elapsed amount of real time, by completion of benchmark code running on the processor, by a system interrupt, and so on. The system block diagram 300 can include a readout delivery element 350. The readout delivery element can deliver the performance profile to a networked storage area or other suitable delivery channels. The networked storage area can include a system memory, a shared memory, cloud-based storage, etc.

Figure 4:
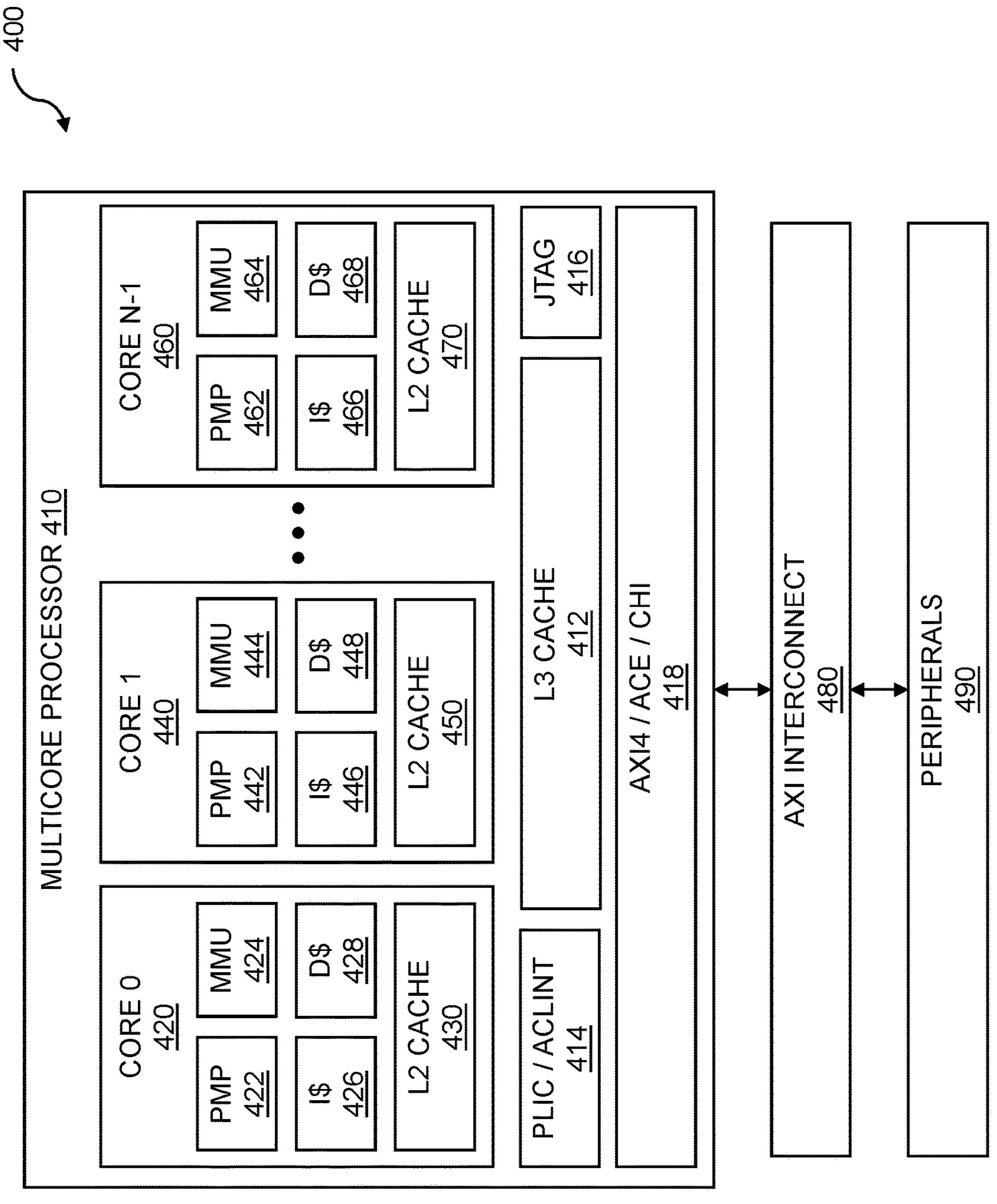
FIG. 4 is a block diagram illustrating a RISC-V processor.

FIG. 4 is a block diagram illustrating a RISC-V processor. The processor can include a multi-core processor, where two or more processor cores can be included. The processor, such as a RISC-V™, processor can include a variety of elements. The elements can include processor cores, one or more caches, memory protection and management units, local storage, and so on. The elements of the multicore processor can further include one or more of a private cache, a test interface such as a joint test action group (JTAG) test interface, one or more interfaces to a network such as a network-on-chip, shared memory, peripherals, and the like. The multicore processor is enabled by processor performance profiling using agents. A processor core is accessed, wherein the processor core includes a performance counter, a performance counter storage area, and a performance counter control register, and wherein the processor core includes a performance monitoring interface. The performance counter, the performance counter storage area, and the performance counter control register are assigned to an external profiling agent. The performance counter and the performance counter control register are loaded by the external profiling agent. A program state is saved to the storage area, based on a counter event in the performance counter and an enable bit in the performance counter control register being set, wherein the program state that is saved corresponds to code being executed on the processor core. The program state is read, from the storage area, by the external profiling agent.

The block diagram 400 can include a multicore processor 410. The multicore processor can comprise two or more processors, where the two or more processors can include homogeneous processors, heterogeneous processors, etc. In the block diagram, the multicore processor can include N processor cores such as core 0 420, core 1 440, core N−1 460, and so on. Each processor can comprise one or more elements. In embodiments, each core, including cores 0 through core N−1, can include a physical memory protection (PMP) element, such as PMP 422 for core 0; PMP 442 for core 1, and PMP 462 for core N−1. In a processor architecture such as the RISC-V™ architecture, PMP can enable processor firmware to specify one or more regions of physical memory such as cache memory of the shared memory, and to control permissions to access the regions of physical memory. The cores can include a memory management unit (MMU) such as MMU 424 for core 0, MMU 444 for core 1, and MMU 464 for core N−1. The memory management units can translate virtual addresses used by software running on the cores to physical memory addresses with caches, the shared memory system, etc.

The processor cores associated with the multicore processor 410 can include caches such as instruction caches and data caches. The caches, which can comprise level 1 (L1) caches, can include an amount of storage such as 16 KB, 32 KB, and so on. The caches can include an instruction cache I$ 426 and a data cache D$ 428 associated with core 0; an instruction cache I$ 446 and a data cache D$ 448 associated with core 1; and an instruction cache I$ 466 and a data cache D$ 468 associated with core N−1. In addition to the level 1 instruction and data caches, each core can include a level 2 (L2) cache. The level 2 caches can include an L2 cache 430 associated with core 0; an L2 cache 450 associated with core 1; and an L2 cache 470 associated with core N−1. The cores associated with the multicore processor 410 can include further components or elements. The further elements can include a level 3 (L3) cache 412. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 414. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 416. The JTAG can provide boundaries within the cores of the multicore processor. The JTAG can enable fault information to a high precision. The high-precision fault information can be critical to rapid fault detection and repair.

The multicore processor 410 can include one or more interface elements 418. The interface elements can support standard processor interfaces such as an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. In the block diagram 400, the interface elements can be coupled to an interconnect. The interconnect can include a bus, a network, and so on. The interconnect can include an AXI™ interconnect 480. In embodiments, the network can include network-on-chip functionality. The AXI™ interconnect can be used to connect memory-mapped “master” or boss devices to one or more “slave” or worker devices. In the block diagram 400, the AXI interconnect can provide connectivity between the multicore processor 410 and one or more peripherals 490. The one or more peripherals can include storage devices, networking devices, and so on. The peripherals can enable communication using the AXI™ interconnect by supporting standards such as AMBA™ version 4, among other standards.

Figure 5:
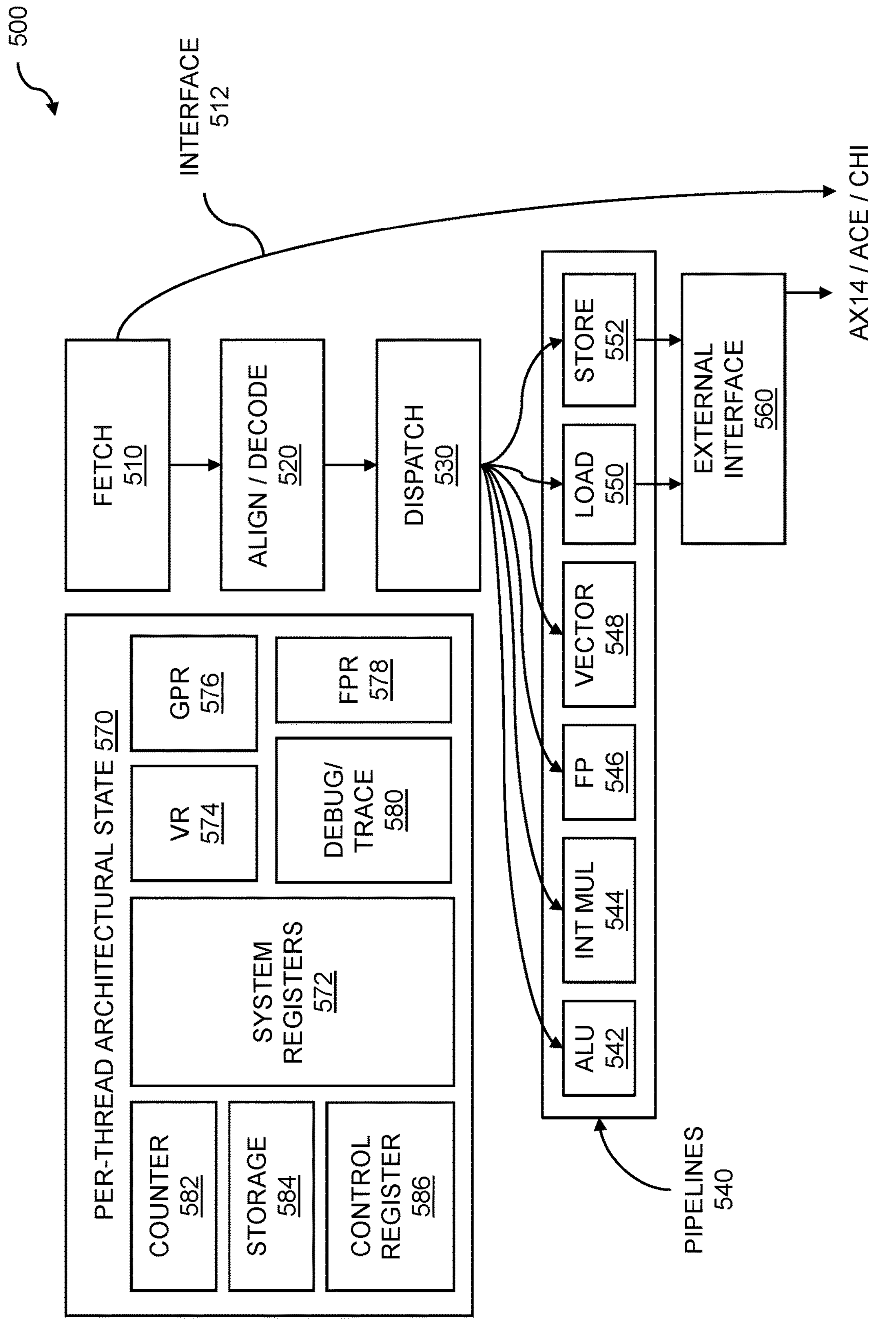
FIG. 5 is a block diagram for a pipeline.

FIG. 5 is a block diagram for a pipeline. The use of one or more pipelines associated with a processor architecture can greatly enhance processing throughput. The processing throughput can be increased because multiple operations can be executed in parallel. The use of one or more pipelines supports processor performance profiling using agents. A processor core is accessed, wherein the processor core includes a performance counter, a performance counter storage area, and a performance counter control register, and wherein the processor core includes a performance monitoring interface. The performance counter, the performance counter storage area, and the performance counter control register are assigned to an external profiling agent. The performance counter and the performance counter control register are loaded by the external profiling agent. A program state is saved to the storage area, based on a counter event in the performance counter and an enable bit in the performance counter control register being set, wherein the program state that is saved corresponds to code being executed on the processor core. The program state is read, from the storage area, by the external profiling agent.

The FIG. 500 shows a block diagram of a pipeline such as a core pipeline. The blocks within the block diagram can be configurable in order to provide varying processing levels. The varying processing levels can be based on processing speed, bit lengths, and so on. The block diagram 500 can include a fetch block 510. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 512. The interface can include a standard interface such as one or more industry standard interfaces. The interfaces can include an Advanced extensible Interface (AXI™), an ARM™ Advanced extensible Interface (AXI™) Coherence Extensions (ACE™) interface, an Advanced Microcontroller Bus Architecture (AMBA™) Coherence Hub Interface (CHI™), etc.

The block diagram 500 includes an align and decode block 520. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 500 can include a dispatch block 530. The dispatch block can receive decoded instruction packets from the align and decode block. The decoded instruction packets can be used to control a pipeline 540, where the pipeline can include an in-order pipeline, an out-of-order (OoO) pipeline, etc. For the case of an in-order pipeline, the dispatch block can maintain a register “scoreboard” and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 542, integer multiplier pipelines 544, floating-point unit (FPU) pipelines 546, vector unit (VU) pipelines 548, and so on. The dispatch unit can further dispatch instructions to pipes that can include load pipelines 550, and store pipelines 552. The load pipelines and the store pipelines can access storage such as the common memory using an external interface 560. The external interface can be based on one or more interface standards such as the Advanced extensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, one or more processor cores can be configured to support multi-threading. The system block diagram can include a per-thread architectural state block 570. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 572. The system registers can be associated with individual processors or processor cores, a system comprising multiple processors or processor cores, and so on. The system registers can include exception and interrupt components, counters, etc. The per-thread architectural state can include further registers such as vector registers (VR) 574, general purpose registers (GPR) 576, and floating-point registers (FPR) 578. These registers can be used for vector operations, general purpose (e.g., integer) operations, and floating-point operations, respectively. The per-thread architectural state can include a debug and trace block 580. The debug and trace block can enable debug and trace operations to support code development, troubleshooting, and so on. In embodiments, an external debugger can communicate with a processor through a debugging interface such as a joint test action group (JTAG) interface. The per-thread architectural state can include a performance counter 582. The performance counter can be used to sample program or code execution, to generate a performance profile, and so on. The performance profile can be based on saving repeated program states. The program states can be sampled on a periodic basis and saved for analysis. In embodiments, the performance profile can be generated by the external profiling agent. The per-thread architecture can include a performance counter storage area 584. The program states, which can be sampled on a periodic basis, can be saved to the storage area, etc. The saving can be based on a counter event in the performance counter. The per-thread architecture can include a performance counter control register 586. In embodiments, the performance counter and the performance counter control register are loaded by the external profiling agent. The loading of the performance counter and the performance counter control register can be based on a particular event. The particular event can be associated with the processor core and can include a counter event, an interrupt or exception, and so on. In embodiments, the particular event can include human direction such as requesting a program profile for a program or code that is executing, analyzing an anomalous event, etc.

Figure 6:
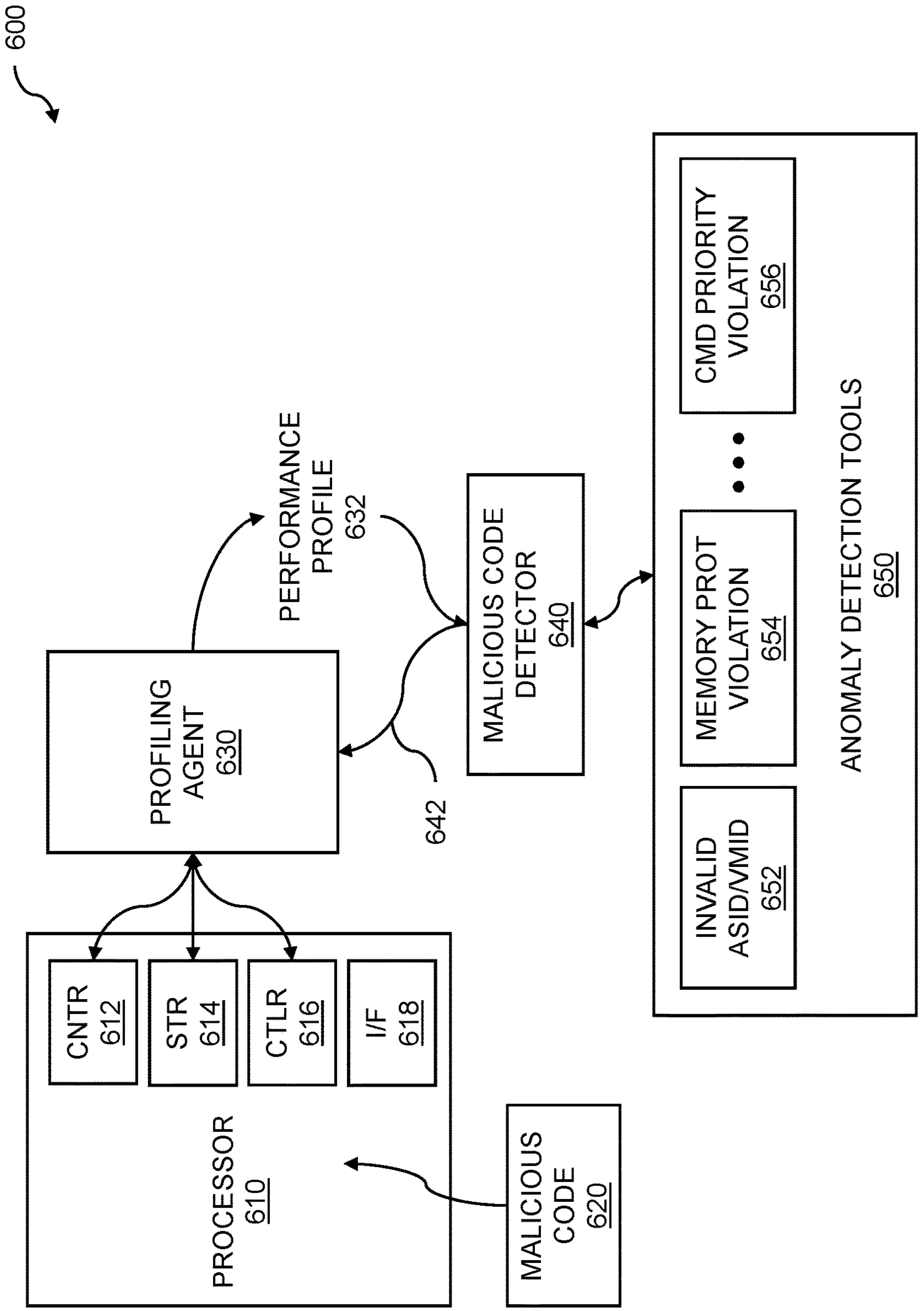
FIG. 6 is an example illustrating malicious code detection.

FIG. 6 is an example illustrating malicious code detection. In addition to generating profiles for programs that are authorized to be executed on a given processor core, nefarious individuals may attempt to load and execute malicious code on the processor. The malicious code can attempt to steal confidential information, to perpetrate extortion by encrypting critical data, to disrupt operations of critical infrastructure, and so on. Since the malicious code can present a performance profile anomaly compared to performance profiles of authorized code, in embodiments, the malicious code can be detected. The malicious code detection is enabled by processor performance profiling using agents. A processor core is accessed, wherein the processor core includes a performance counter, a performance counter storage area, and a performance counter control register, and wherein the processor core includes a performance monitoring interface. The performance counter, the performance counter storage area, and the performance counter control register are assigned to an external profiling agent. The performance counter and the performance counter control register are loaded by the external profiling agent. A program state is saved to the storage area, based on a counter event in the performance counter and an enable bit in the performance counter control register being set, wherein the program state that is saved corresponds to code being executed on the processor core. The program state is read, from the storage area, by the external profiling agent.

Malicious code detection 600 can include a processor 610. The processor can include standalone processors within integrated circuits or chips, processor cores such as cores in FPGAs or ASICs, and so on. In embodiments, the processor can be based on a processor architecture such as a RISC-V™ architecture. The processor architecture can include a multicore processor architecture. The processor can execute an operating system, one or more program codes, and the like. The processor can include one or more elements such as one or more of an arithmetic logic unit (ALU), a memory management unit (MMU), one or more levels of cache memory, and so on. In embodiments, the processor can include a performance counter 612. The performance counter can be used to sample execution of a program, code, etc. The performance counter can be controlled by an external profiling agent (discussed below). In embodiments, the processor can include a performance counter storage area 614. The performance counter storage area can be used to store one or more one or more program states associated with execution of a program, performance data, etc. In embodiments, the processor can include a performance counter control register 616. The performance counter control register can include one or more fields. The fields associated with the performance counter control register can include an event designation, enable/disable profiling, a sampling period, etc. In further embodiments, the processor can include one or more interfaces 618. The interfaces can include one or more industry standard interfaces, interfaces specific to the processor, and the like. In embodiments, the interfaces can include an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. The interfaces can enable connection between the processor and an interconnect. In embodiments, the interconnect can include an AXI™ interconnect. The interconnect can enable the multicore processor to access a variety of peripherals such as storage elements, communications elements, etc.

Malicious code 620 can be introduced into the processor using various techniques. The malicious code can include a variety of forms, purposes, guises, and so on. The malicious code is introduced with the intention to disrupt, damage, or destroy operations performed by the processor. The malicious code can be used to inflict financial damage, to extort payment, etc. The malicious code can include code for fileless malware, trojans, spyware, adware, rootkits, worms, bots, keyloggers, wiper malware, mobile malware, and the like. Because of the financial, operational, and at times physical damage that can be caused by the malicious code, it is imperative to detect the presence of malicious code as early and as quickly as possible. To assist with malicious code detection, a profiling agent 630 can be used. In embodiments, the profiling agent can further be used to counteract the effects of the malicious code. Described previously and throughout, the performance counter 612, the performance counter storage area 614, and the performance counter control register 616 can be assigned to an external profiling agent. The external profiling agent can load the performance counter and the performance counter control register in order to monitor a particular code executing on the processor core. The external profiling agent can be used to access state information such as state information associated with the particular code. The program state can be saved to the storage area 614. The program state can be sampled periodically, and the state samples can be stored in the storage area. In embodiments, the saving can be based on a counter event in the performance counter. A counter event can include a counter increment, a counter decrement, a counter overflow, etc.

In embodiments, the loading by the external profiling agent can be based on a particular event in the processor core. The event can include an interrupt, an execution exception, and so on. Discussed above, in embodiments, the particular event includes particular code running on the processor core. The particular code can be associated with an operating system, an application, and the like. In other embodiments, the particular event can include human direction. The human direction can be initiated by a system operator or "sysop", system users, etc. The human direction can be based on a routine system check, an indication of anomalous processor activity, and so on. The program state can be read from the storage area by the external profiling agent. The program state can be based on an execution exception, an interrupt, etc. The saved program states can be analyzed to determine computational resource allocation and usage, processing duration, and so on. Embodiments further include generating a performance profile 632, based on the saving of repeated program states. The profile can indicate resource allocation, usage, etc., and the profile can be associated with a particular code. The profile can serve as an identifier for the code based on a substantially consistent profile associated with each execution of the particular code. If the generated profile is different from the "typical" profile, then the code may be compromised, legitimate code may be spoofed, and so on.

The performance profile 632 can be analyzed by a malicious code detector 640. The malicious code detector can analyze the performance profile provided by the external profile agent to determine whether the current code performance profile substantially matches profiles generated when the particular code was previously executed. The performance profile can vary based on tasks performed by an operating system, the mix of codes executed by the processor core at a given time, and so on. The performance profile can also differ due to corruption of the particular code, introduction of malicious code into the particular code, spoofing of the particular code by malicious code presenting itself as the particular code, etc. The performance profile can include an anomalous performance profile. The malicious code detector can use a variety of techniques and tools to detect malicious code. The malicious code detector can apply one or more techniques or tools to a performance profile and can provide an indication 642 to the profile agent. The profile agent can use the provided indication to collect additional program state data, to act against a suspected malicious code, etc.

In embodiments, the malicious code detector can access one or more anomaly detection tools 650. The anomaly detection tools can be based on verified codes such as checksums, identifiers, tags, and so on. In embodiments, the program state can include program execution identification values. The identification values can include values associated with program size, data access patterns, processor core utilization, etc. In embodiments, the anomaly detection tools can include an invalid ASID/VMID tool 652 to analyze the identification values. In embodiments, the program execution identification values can include an address space identifier (ASID) and/or a virtual machine identifier (VMID). An invalid ASID/VMID tool can be used to compare program execution identification values to known values and can flag the values as invalid if the values differ. The difference in values can include values within a tolerance. In embodiments, the anomaly detection tools can include a memory protection violation tool 654. The memory protection violation tool can indicate that one or more memory accesses which violate memory protection rules were attempted. The anomaly detection tools can include a command priority violation tool 656. The command priority violation tool can indicate that execution of a command was attempted by a user or a program with insufficient privileges to execute the command.

Figure 7:
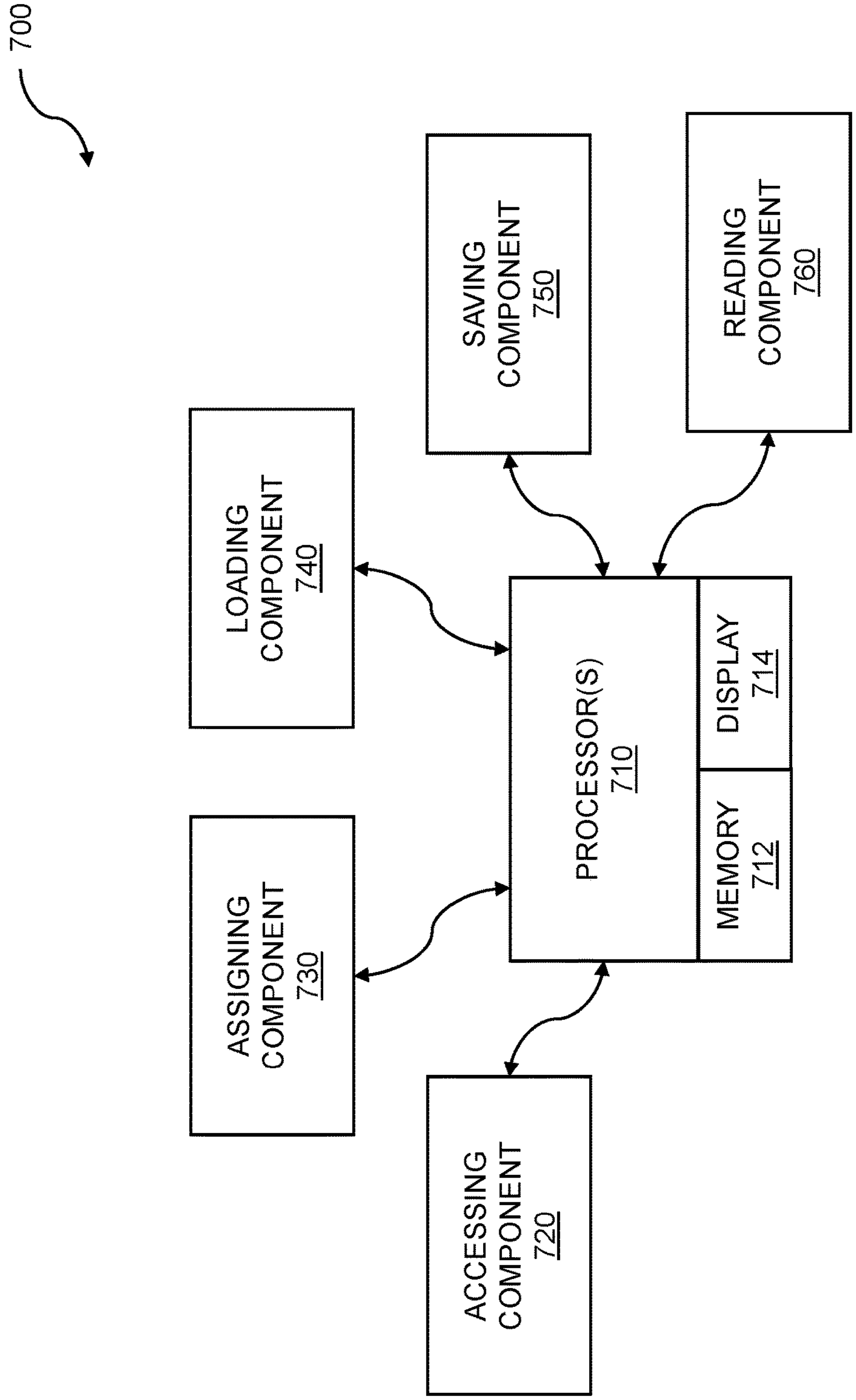
FIG. 7 is a system diagram for processor performance monitoring using agents.

FIG. 7 is a system diagram for performance profiling. Disclosed herein, the system can include a design automation system, where the design automation system can use one or more processors to generate semiconductor logic. The system can further include an apparatus for performance profiling. The performance profiling is enabled by processor performance monitoring using agents. The system can include one or more of processors, memories, cache memories, displays, counters, and so on. The system 700 can include one or more processors 710. The processors can include standalone processors within integrated circuits or chips, processor cores such as cores in FPGAs or ASICs, and so on. The one or more processors 710 are coupled to a memory 712, which stores operations. The memory can include one or more of local memory, cache memory, system memory, etc. The system 700 can further include a display 714 coupled to the one or more processors 710. The display 714 can be used for displaying data, instructions, operations, and the like. The operations can include processor performance profiling operations, where the processor performance operations can enable reading a program state by an external profiling agent. In embodiments, one or more processors 710 are coupled to the memory 712, wherein the one or more processors, when executing the instructions which are stored, are configured to: access a processor core, wherein the processor core includes a performance counter, a performance counter storage area, and a performance counter control register, and wherein the processor core includes a performance monitoring interface; assign the performance counter, the performance counter storage area, and the performance counter control register to an external profiling agent; load the performance counter and the performance counter control register by the external profiling agent; save a program state to the storage area, based on a counter event in the performance counter and an enable bit in the performance counter control register being set, wherein the program state that is saved corresponds to code being executed on the processor core; and read the program state, from the storage area, by the external profiling agent.

The system 700 can include an accessing component 720. The accessing component 720 can access a processor core. The processor core can be accessed within one or more of one or more integrated circuits or chips, programmable or configurable integrated circuits such as FPGAs or ASICs, etc. More than one processor core can be accessed. In embodiments, the processor core can include RISC-V™ processor core. The processor can include various components that supplement the operation of the processor core. The processor core includes a performance counter, a performance counter storage area, and a performance counter control register. The performance counter, the performance counter storage area, and the performance counter control register can enable the processor to sample program execution as the program is executed by the processor. The counter, counter storage area, and counter control register further enable the processor core to generate profiles associated with the execution of the program. The processor core includes a performance monitoring interface. The performance monitoring interface can enable the processor core to interact with an external profiling agent. The performance monitoring interface enables reading of a state such as a program state by an external profiling agent. The external profiling agent can generate the performance profile associated with program execution, thereby freeing the processor core to execute operations associated with a program unimpeded by determining the program profile. Further, the external agent can perform program profiling substantially continuously. Each processor of the one or more processor cores has access to memory such as a common memory. The common memory can include on-chip memory, off-chip memory, etc.

The system 700 can include an assigning component 730. The assigning component 730 can assign the performance counter, the performance counter storage area, and the performance counter control register to an external profiling agent. The external profiling agent can operate autonomously once set up by a user, a profiling tool, an operating system, and so on. The external agent can include code that when executed can collect data, information, metrics, and the like associated with the processor core. The external profiling agent can collect profiling information such as CPU usage, memory usage, memory access latency, network latency, and so on. The external profiling agent can comprise code executed on semiconductor logic, where the semiconductor logic can include logic associated with the processor core, logic separate from the processor core, etc. The external profiling agent can perform substantially continuous profiling of code executed by the processor core. The substantially continuous profiling of the code can detect one or more performance anomalies and can enable analysis of the anomalous code execution behavior. Since the profiling is performed by the profiling agent, code execution by the processor core can proceed unimpacted by the profiling. The code execution profile data can more accurately represent code execution on the processor core since the processor core can be freed of the profiling, thus yielding improved profile data analysis results.

The system 700 can include a loading component 740. The loading component 740 can load the performance counter and the performance counter control register by the external profiling agent. The performance counter can be set, reset, incremented, decremented, and so on. A performance counter value can include a large value, such as a value with an order of magnitude of millions, billions, and so on. The performance counter value can include a number of cycles that can elapse in order to determine a performance profile point. The performance counter value can be incremented or decremented by an amount, where the amount can be large such as an order of magnitude of millions, small such as an order of magnitude of ones, etc. The performance counter control register can include one or more fields. The fields can include one or more bits that indicate which event occurring within the processor core is being counted by the performance counter; one or more bits that indicate whether profiling is enabled or disabled; one or more bits associated with a value to which the performance counter could be set to track an overflow event; one or more bits to set a sampling period; and so on. The storage area can be located within the processor core, coupled to the processor core, accessible to the processor core, etc. The storage area can be used by the performance counter to store collected profile data. The storage area can be accessible to the external profiling agent. The performance counter can include semiconductor logic that can be used to read a program counter (PC) value and values associated with other program states. The performance counter can store those values to the counter storage area. The values associated with other program states can include a program executing with the processor core.

In embodiments, the loading by the external profiling agent can be based on a particular event in the processor core. The event can include an exception, an interrupt, and so on. The event can include an overflow event such as an arithmetic overflow event. The event can be associated with a process, a program, etc. In embodiments, the particular event can include particular code running on the processor core. The code can be associated with a program, an application or app, an operating system, and the like. The event can include an external event. In embodiments, the particular event can include human direction. The human direction can include initiating an external profiling agent, controlling the agent, requesting information such as profile information from the agent, etc. In embodiments, the external profiling agent can load the performance counter and the performance counter control register, based on the particular event. The loading can be initiated by the human direction, executed by the external profiling agent, and so on. The event can include a counter event. In embodiments, the counter event can include incrementing the performance counter by a value N. N can include an integer value that can be used to for the incrementing. The integer can include a small value such as one, a larger value such as one million, etc. In other embodiments, the performance counter can be incremented to a value M. The value M can be substantially similar to the value N, substantially different from the value N, etc. In other embodiments, the counter event can include decrementing the performance counter by a value N. The value N can include a small value such as one, a large value such as one million, and so on. The value associated with the incrementing and the value associated with the decrementing can be substantially similar or substantially dissimilar. In other embodiments, the performance counter can be decremented to a value M.

The system 700 can include a saving component 750. The saving component 750 can save a program state to the storage area, based on a counter event in the performance counter and an enable bit in the performance counter control register being set, wherein the program state that is saved corresponds to code being executed on the processor core. The code that is being executed can access memory such as a shared memory to read or load data, can process the data, can write or store the data to storage, and so on. The code can access system calls to an operating system to open and close files, create files, access networked resources, etc. In embodiments, the saving a program state can be periodically repeated, based on the external profiling agent. The external profiling agent can provide a sampling rate to determine the program state and to save the program state. The external profiling agent can increase, decrease, or leave unchanged the sampling rate. In embodiments, the saving of repeated program states can occur on a regular basis. The regular basis can include an amount of time, a number of cycles, etc. In embodiments, the regular basis can be every 100 ms. Other amounts of time can also be used.

The saved program states can be analyzed to provide data, information, and so on associated with the program. In embodiments, the program state can include program execution identification values. The identification values can include tags, labels, embedded codes, and so on. In embodiments, the program execution identification values can include an address space identifier (ASID) and/or a virtual machine identifier (VMID). Further embodiments include generating a performance profile, based on the saving of repeated program states. The performance profile can include graphics, tables, analysis results, and the like. In embodiments, the performance profile can be generated by the external profiling agent. Other information can be used to generate the performance profile. Further embodiments include augmenting the performance profile using context information from the processor core. The context information can include percentages of resources used, other codes that may be executing at substantially the same time, exception handling due to interrupts, and so on. The performance profile can be saved or delivered to one or more storage locations, devices, systems, etc. Further embodiments include delivering the performance profile to a networked storage area. The networked storage area can be accessible to one or more processor cores, one or more agents, etc. Further embodiments include freeing the storage area for additional program states, based on completion of the saving. The freeing the storage area can minimize storage use. The performance profile can be used for further analysis and detection applications. In embodiments, the performance profile can enable malicious code execution detection. The performance profile can be compared to performance profiles associated with the execution of known, approved, or otherwise appropriate codes. A divergent performance profile can indicate the presence of malicious code.

The system 700 can include a reading component 760. The reading component 760 can read the program state, from the storage area, by the external profiling agent. The reading can include reading the program state from the storage and providing the state to a “principal”, where the principal can include a user such as a security expert, an analyst, and so on. Further embodiments include delivering the performance profile to a system administrator or system users. The system administrator can use the performance profile and program state information to monitor system operation, to identify and track anomalous system activity or behavior, to initiate a procedure to counter a system intrusion or attack, and the like.

The system 700 can include a computer program product embodied in a non-transitory computer readable medium for performance profiling, the computer program product comprising code which causes one or more processors to generate semiconductor logic for: accessing a processor core, wherein the processor core includes a performance counter, a performance counter storage area, and a performance counter control register, and wherein the processor core includes a performance monitoring interface; assigning the performance counter, the performance counter storage area, and the performance counter control register to an external profiling agent; loading the performance counter and the performance counter control register by the external profiling agent; saving a program state to the storage area, based on a counter event in the performance counter and an enable bit in the performance counter control register being set, wherein the program state that is saved corresponds to code being executed on the processor core; and reading the program state, from the storage area, by the external profiling agent.

The system 700 can be implemented as an apparatus for performance profiling comprising: a processor core comprising a performance counter, a performance counter storage area, and a performance counter control register, wherein the processor core and the performance counter are used to perform operations comprising: accessing the processor core wherein the processor core includes a performance monitoring interface; assigning the performance counter, the performance counter storage area, and the performance counter control register to an external profiling agent; loading the performance counter and the performance counter control register by the external profiling agent; saving a program state to the storage area, based on a counter event in the performance counter and an enable bit in the performance counter control register being set, wherein the program state that is saved corresponds to code being executed on the processor core; and reading the program state, from the storage area, by the external profiling agent.

Each of the above methods may be executed on one or more processors on one or more computer systems. Embodiments may include various forms of distributed computing, client/server computing, and cloud-based computing. Further, it will be understood that the depicted steps or boxes contained in this disclosure’s flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions-generally referred to herein as a “circuit,” “module,” or “system”—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for performance profiling comprising:

accessing a processor core, wherein the processor core includes a performance counter, a performance counter storage area, and a performance counter control register, and wherein the processor core includes a performance monitoring interface;

assigning the performance counter, the performance counter storage area, and the performance counter control register to an external profiling agent;

loading the performance counter and the performance counter control register by the external profiling agent;

saving a program state to the storage area, based on a counter event in the performance counter and an enable bit in the performance counter control register being set, wherein the program state that is saved corresponds to code being executed on the processor core; and reading the program state, from the storage area, by the external profiling agent.

2. The method of claim 1 wherein the loading by the external profiling agent is based on a particular event in the processor core.

3. The method of claim 2 wherein the particular event includes particular code running on the processor core.

4. The method of claim 2 wherein the particular event includes human direction.

5. The method of claim 2 wherein the external profiling agent loads the performance counter and the performance counter control register, based on the particular event.

6. The method of claim 1 wherein the counter event includes incrementing the performance counter by a value N.

7. The method of claim 6 wherein the performance counter is incremented to a value M.

8. The method of claim 1 wherein the counter event includes decrementing the performance counter by a value N.

9. The method of claim 8 wherein the performance counter is decremented to a value M.

10. The method of claim 1 wherein the saving a program state is periodically repeated, based on the external profiling agent.

11. The method of claim 10 further comprising generating a performance profile, based on the saving of repeated program states.

12. The method of claim 11 wherein the performance profile is generated by the external profiling agent.

13. The method of claim 12 further comprising augmenting the performance profile using context information from the processor core.

14. The method of claim 12 further comprising delivering the performance profile to a system administrator or system users.

15. The method of claim 12 further comprising delivering the performance profile to a networked storage area.

16. The method of claim 11 wherein the saving of repeated program states occurs on a regular basis.

17. The method of claim 16 wherein the regular basis is every 100 ms.

18. The method of claim 16 further comprising freeing the storage area for additional program states, based on completion of the saving.

19. The method of claim 11 wherein the performance profile enables malicious code execution detection.

20. The method of claim 19 wherein the malicious code execution detection includes performance anomaly detection.

21. The method of claim 1 wherein the performance counter control register includes settings for which event the performance counter is counting, whether profiling is enabled, and what a sampling period comprises.

22. The method of claim 1 wherein the performance counter, the performance counter storage area, and the performance counter control register use logic associated with the performance counter to control the saving.

23. The method of claim 1 wherein the program state includes program execution identification values.

24. The method of claim 23 wherein the program execution identification values include an address space identifier (ASID) and/or a virtual machine identifier (VMID).

25. A computer program product embodied in a non-transitory computer readable medium for performance profiling, the computer program product comprising code which causes one or more processors to generate semiconductor logic for:

accessing a processor core, wherein the processor core includes a performance counter, a performance counter storage area, and a performance counter control register, and wherein the processor core includes a performance monitoring interface;

assigning the performance counter, the performance counter storage area, and the performance counter control register to an external profiling agent;

loading the performance counter and the performance counter control register by the external profiling agent;

saving a program state to the storage area, based on a counter event in the performance counter and an enable bit in the performance counter control register being set, wherein the program state that is saved corresponds to code being executed on the processor core; and reading the program state, from the storage area, by the external profiling agent.

26. An apparatus for performance profiling comprising:

a processor core comprising a performance counter, a performance counter storage area, and a performance counter control register, wherein the processor core and the performance counter are used to perform operations comprising:

accessing the processor core wherein the processor core includes a performance monitoring interface;

assigning the performance counter, the performance counter storage area, and the performance counter control register to an external profiling agent;

loading the performance counter and the performance counter control register by the external profiling agent;

saving a program state to the storage area, based on a counter event in the performance counter and an enable bit in the performance counter control register being set, wherein the program state that is saved corresponds to code being executed on the processor core; and reading the program state, from the storage area, by the external profiling agent.

* * * * *